(12) United States Patent
Arimilli et al.

(10) Patent No.: US 6,397,298 B1
(45) Date of Patent: May 28, 2002

(54) CACHE MEMORY HAVING A PROGRAMMABLE CACHE REPLACEMENT SCHEME

(75) Inventors: Ravi Kumar Arimilli, Austin; John Steven Dodson, Pflugerville; Guy Lynn Guthrie, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/364,573

(22) Filed: Jul. 30, 1999

(51) Int. Cl.[7] .............................................. G06F 12/08
(52) U.S. Cl. ..................................... 711/133; 711/128
(58) Field of Search ................................. 711/128, 133

(56) References Cited

U.S. PATENT DOCUMENTS

| | | | |
|---|---|---|---|
| 4,928,239 A | | 5/1990 | Baum et al. ................. 711/136 |
| 5,253,351 A | * | 10/1993 | Yamamoto et al. .......... 711/118 |
| 5,752,261 A | * | 5/1998 | Cochcroft, Jr. .............. 711/133 |
| 5,765,191 A | * | 6/1998 | Loper et al. ................. 711/136 |
| 5,787,478 A | * | 7/1998 | Hicks et al. ................. 711/141 |
| 6,240,489 B1 | * | 5/2001 | Durham et al. .............. 711/136 |

\* cited by examiner

Primary Examiner—Reba I. Elmore
(74) Attorney, Agent, or Firm—Casimer K. Salys; Bracewell & Patterson, L.L.P.

(57) ABSTRACT

A cache memory having a programmable cache replacement scheme is disclosed. After a cache "miss," a linefill operation is first preformed on a cache line. Subsequent to the linefill operation, the cache line is then assigned to an access status other than the most recently used status. The assignment of the access status is based on a programmable setting that defines an access status after a linefill operation and all other subsequent accesses.

12 Claims, 3 Drawing Sheets

CACHE MEMORY HAVING A PROGRAMMABLE CACHE REPLACEMENT SCHEME

RELATED PATENT APPLICATION

The present patent application is related to copending application U.S. Ser. No. 09/364,572, filed on even date, entitled "A CACHE MEMORY HAVING AN INSTRUCTION-INITIATED REPLACEMENT SCHEME".

BACKGROUND OF THE INVENTION

1. Technical Field

The present invention relates to a data processing system in general, and in particular to a data processing system that utilizes a cache memory. Still more particularly, the present invention relates to a data processing system that utilizes a cache memory having a programmable cache replacement scheme.

2. Description of the Prior Art

Typically, a data processing system comprises a central processing unit (CPU), a main memory, and an input/output device. For some time, the speed at which the CPU can decode and execute instructions has far exceeded the speed at which instructions can be transferred from the main memory to the CPU. In an attempt to reduce this disparity, a cache memory is interposed between a CPU and a main memory in many data processing systems. A cache memory is a small, high-speed memory that is used to temporarily hold information, such as data and/or instruction, that is likely be used in the near future by the CPU.

A cache memory contains many cache lines in which information is stored. Each cache line has an address tag that uniquely identifies which block of a main memory it stores. Each time the CPU references a memory, the cache memory compares the reference address with address tags stored within to determine if the cache memory holds a copy of the requested information. If the cache memory has a copy of the requested information, the cache memory supplies the requested information to the CPU; otherwise, the requested information is retrieved from the main memory. Because information located within a cache memory may be accessed in much less time than that located in a main memory, a CPU having a cache memory spends far less time waiting for information to be fetched and/or stored.

Earlier cache memory designs were typically fully-associative, meaning all elements within a cache memory are searched associatively for each request from the CPU. However, large fully-associative cache memories are very expensive and relatively slow. Thus, in order to provide an access time acceptable for use with a CPU, the size of a full-associative cache memory is necessarily limited, which yields a rather low hit ratio. More recently, cache memories have been organized into groups of smaller associative memories called sets, and those cache memories are known as set-associative cache memories. For a cache memory having L cache lines, divided into s sets, there are L/s cache lines in each set. When an address in the main memory is mapped into the cache memory, the address can appear in any of the s sets. For a cache memory of a given size, searching each of the sets in parallel can improve access time by a factor of s. Nevertheless, the time to complete the required search is still undesirably lengthy.

The operation of cache memories to date has been based upon the assumption that, because a particular memory location has been referenced, those locations very close to it are very likely to be accessed in the near future. This is often referred to as the property of locality. The property of locality has two aspects, namely, temporal and spatial. Temporal locality (or property of locality by time) means that the information that will be in use in the near future is likely to be in use already. This type of behavior can be expected from certain data structures, such as program loops, in which both data and instructions are reused. Spatial locality (or property of locality by space) means that portions of the address space that are in use generally consist of a fairly small number of contiguous segments of that address space. In other words, the loci of reference of the program in the near future are likely to be near the current loci of reference. This type of behavior can be expected from common knowledge of program structure: related data items (variables, arrays) are usually stored together, and instruction are mostly executed sequentially. Because the cache memory retains segments of information that have been recently used, the property of locality implies that certain requested information is also likely to be found in the cache memory.

It is quite apparent that the larger the cache memory, the higher the probability of finding the requested information in the cache memory. Cache sizes cannot be expanded without limit, however, for reasons such as cost and access time. Thus, when a cache "miss" occurs, a decision must be made as to what information should be swapped out to make room for the new information being retrieved from a main memory via a process known as cast-out. Various cache replacement schemes can be utilized to decide what information should be cast-out after a cache "miss." Among those cache replacement schemes that are well-known in the art, the most commonly utilized replacement scheme is the Least-Recently Used (LRU) replacement scheme. According to the LRU replacement scheme, a cache memory maintains several status bits that track the access order of each cache line. Each time a cache line is accessed, the status bits of the accessed cache line is marked most recently used, and the status bits of the other cache lines are adjusted accordingly. When a cache "miss" occurs, the information of the LRU cache line is cast-out to make room for the requested information being retrieved from the main memory. Other cache replacement schemes that are also widely used are First-In-First-Out (FIFO) and random replacement, the nomenclature of each being self-explanatory.

Contrary to the above-stated assumption, however, not all computer data structures have the same kind of data locality. For some simple structures such as data stacks or sequential data, the above-mentioned LRU replacement scheme is not optimal. Thus, in prior art cache memory structures and in accordance with the basic assumption that the most likely data to be referenced is that which were referenced most recently or are close to that data in physical address, no provision has been made in cache memory operation for deviation from the standard cache replacement schemes mentioned above. Consequently, it would be desirable to provide a cache memory having a more flexible cache replacement scheme.

SUMMARY OF THE INVENTION

In accordance with a preferred embodiment of the present invention, a linefill operation is first performed on a cache line after a cache "miss." After the linefill operation, the cache line can be assigned to any access status, but preferably not the most recently used status. The assignment of the access status is based on a programmable setting that defines an access status after a linefill operation and all other subsequent accesses.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
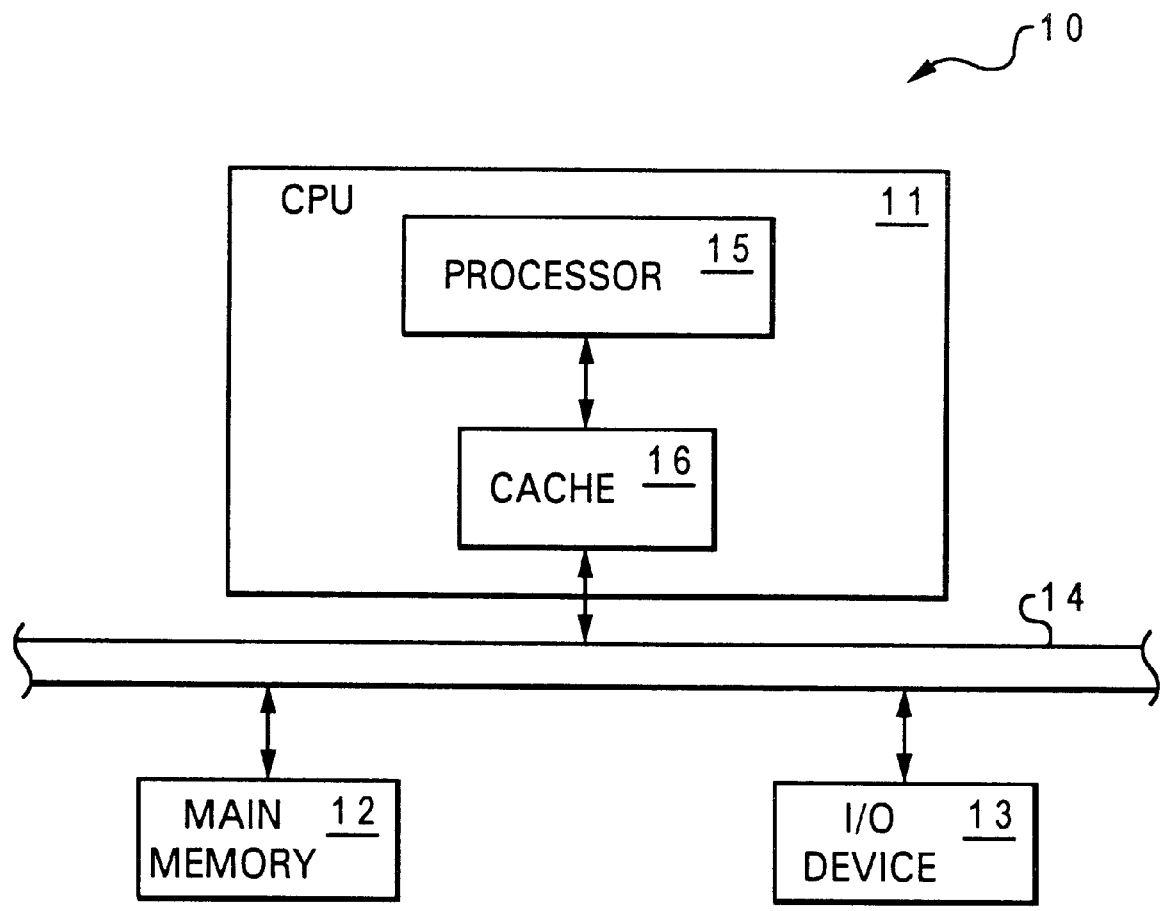
FIG. 1 is a block diagram of a data processing system in which a preferred embodiment of the present invention is incorporated.

Referring now to the drawings and in particular to FIG. 1, there is depicted a block diagram of a data processing system in which a preferred embodiment of the present invention is incorporated. As shown, a data processing system 10 includes a central processing unit (CPU) 11, a main memory 12, and an input/output (I/O) device 13. CPU 11 communicates with main memory 12 and I/O device 13 via a system bus 14. CPU 11 includes a processor 15 for decoding and executing instructions, and a cache memory 16 for storing a subset of information (i.e., instructions and/or data) that are stored within main memory 12.

Figure 2:
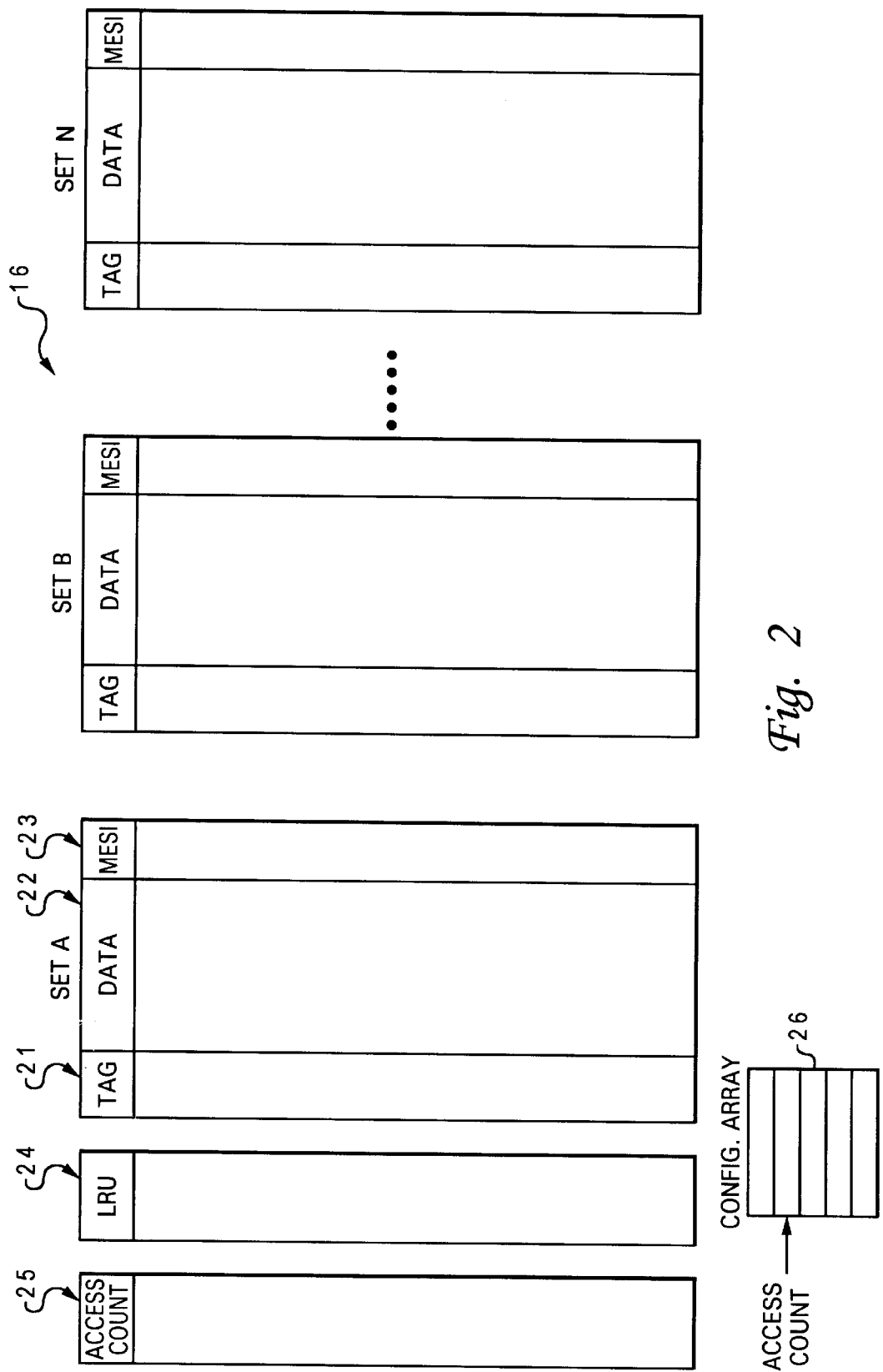
FIG. 2 is a block diagram of a cache memory within the data processing system from FIG. 1, in accordance with a preferred embodiment of the present invention.

With reference now to FIG. 2, there is illustrated a block diagram of cache memory 16, in accordance with a preferred embodiment of the present invention. As shown, cache memory 16 is a set-associative cache memory having multiple sets A–N. Each of sets A–N includes multiple cache lines, and each cache line comprises a tag field 21 and a data field 22. Each data field 22 may contain, for example, eight words of data. In addition to tag field 21 and data field 22, each cache line has a two-bit status field 23. The utilization of status bits within status field 23, such as a MESI protocol, to indicate the coherence status of a cache line is well-known in the art. Furthermore, cache memory 16 also has a least-recently used (LRU) status field 24 that contains a group of bits for tracking the access status (or access order) of each cache line within the same congruence class of cache memory 16. Along with LRU status field 24, an access count field 25 is included to keep track of the access count (or access frequency) of each cache line within the same congruence class of cache memory 16. In other words, bits within access count field 25 are utilized to track the number of cache "hits" for each cache line within the same congruence class.

During operation, each time processor 15 (from FIG. 1) makes a memory reference, a search is performed to find out if a copy of the requested information is contained within cache memory 16. If the requested information is not contained within cache memory 16, then processor 15 fetches the requested information from a block within main memory 13 (from FIG. 1) and stores the requested information in cache memory 16. If a congruence class of cache memory 16 to which the information should be mapped is full, information from one of the cache lines will need to be cast-out in order to accommodate the new incoming information. If the information of the cache line to be cast-out has been updated (i.e., the cache line is "dirty"), then that information must be written back to an appropriate address in main memory 16 in order to maintain data consistency. The process of replenishing information to a cache line after a cast-out is known as a linefill.

When using an LRU replacement scheme, the bits within LRU status field 24 identify which cache line of a congruence class is the least recently used such that it is the most eligible candidate for replacement. According to the prior art LRU replacement scheme, and most other similar replacement schemes, each time a cache line is accessed, the bits within LRU status field 24 that are associated with the accessed cache line are marked most recently used (MRU), and the remaining bits within LRU status field 24 that are associated with the other cache lines in the same congruence class are adjusted accordingly.

A cache line after a linefill operation can be assigned to any access order. In the present implementation, a cache line after a linefill operation is preferably assigned to any access order other than a MRU state. The term "access order" is used to define a new access position that will be assigned to a cache line that has been referenced. The access order is written into LRU status field 24 and becomes the access status for that cache line when the cache line is referenced again in the future.

Figure 3:
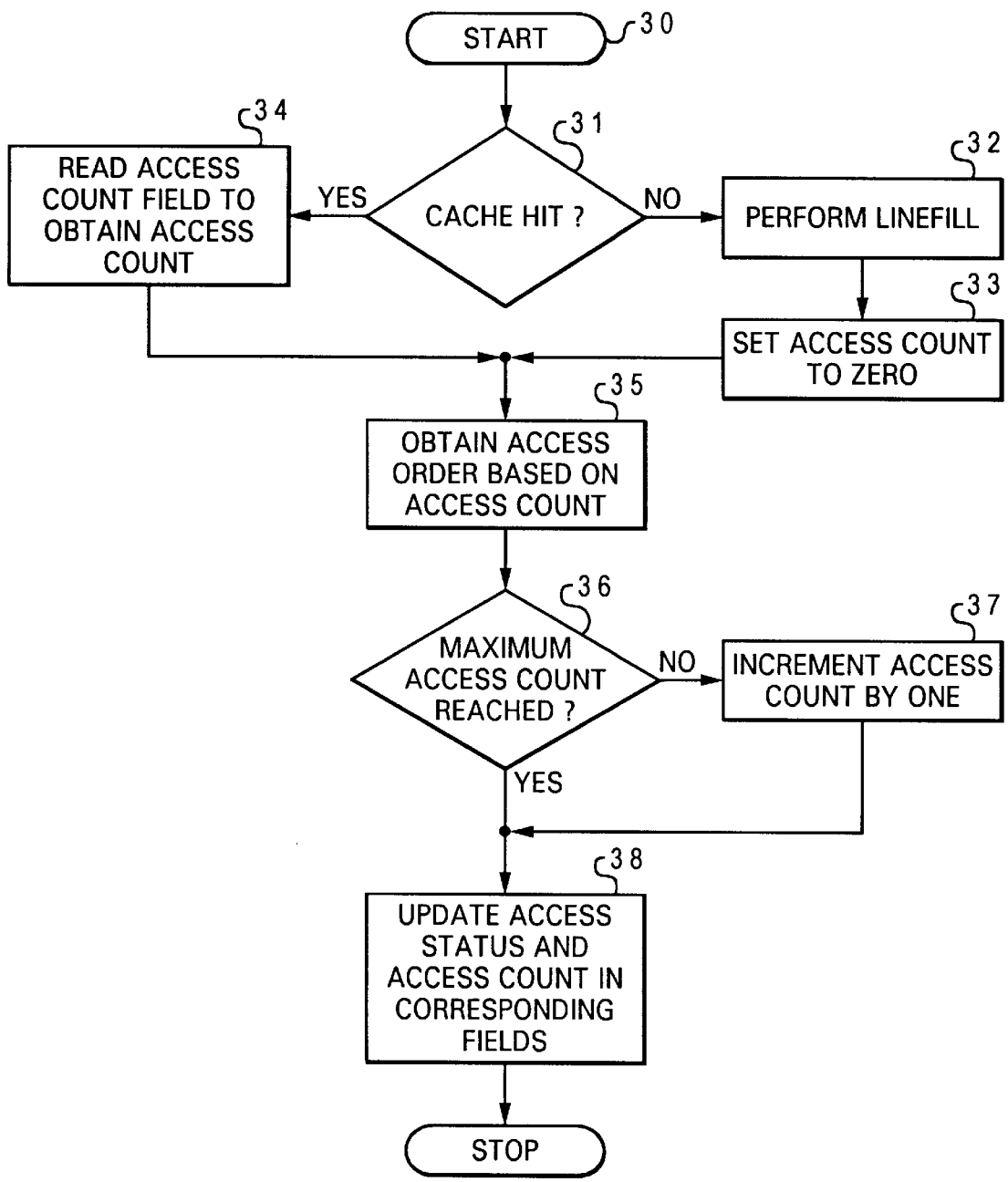
FIG. 3 is a high-level logic flow diagram of a method for replacing cache lines within the cache memory from FIG. 2, in accordance with a preferred embodiment of the present invention.

Referring now to FIG. 3, there is illustrated a high-level logic flow diagram of a method for replacing cache lines within cache memory 16 (from FIG. 2), in accordance with a preferred embodiment of the present invention. Starting at block 30, when there is a request for information by a processor, a determination is made as to whether the requested information is resided within a cache memory, as shown in block 31. If there is a cache "miss," a linefill operation is performed, as depicted in block 32. The access count for the "linefilled" cache line is then set to, preferably, zero, as illustrated in block 33. Otherwise, if there is a cache "hit," the access count for the cache line is read from access count field 25, as shown in block 34.

Next, an access order for the cache line that indicates the new LRU position for this cache line is obtained, as illustrated in block 35. In the present implementation, a configuration array 26, as shown in FIG. 2, is utilized to store a number of preassigned access orders, and the previously obtained access count is utilized to index to one of the preassigned access orders. Configuration array 26 is preferably stored in a register. Although each access order within configuration array 26 is preassigned, an access order within configuration array 26 can be adaptively changed during software execution. For example, a program monitor can be used to detect the data/program structure of the software during execution, and the access orders within configuration array 26 can be altered according to the results of the program monitor.

As such, the access status of the cache line after the linefill operation can be assigned to any access status, as mentioned previously. In the present implementation, the access status is preferably assigned to an access status other than the MRU status (i.e., MRU-1 status through LRU status). Furthermore, if the cache line is subsequently accessed or referenced, the access status of the cache line can be any access status including the MRU status. For example, the access status of a cache line can be initially assigned to a MRU-4 status after a linefill operation, then to a MRU-2 status after the first cache "hit," then to a MRU status for all other subsequent cache "hits;" instead of assigned directly to MRU as contemplated in the prior art.

A determination is then made as to whether or not the maximum access count has been reached, as shown in block 36. The maximum access count is preferably the maximum number of access orders entries within the configuration array. If the maximum access count has not been reached, the access count of the referenced cache line is incremented by one, as depicted in block 37. Otherwise, if the maximum access count has been reached, associated bits of the referenced cache line within access status field 24 (FIG. 2) and associated bits of the referenced cache line within access count field 25 (from FIG. 2) are updated, as illustrated in block 38. Except for the unaffected cache lines, the access status of the remaining cache lines in the congruence class is then updated accordingly. For example, if the new access status of a cache line is MRU-3, then the access status of the MRU-3 cache line through the LRU cache line will be updated while the access status of the MRU, MRU-1, and MRU-2 cache lines is unaffected.

As has been described, the present invention provides a data processing system that utilizes a cache memory having a programmable cache replacement scheme.

While the invention has been particularly shown and described with reference to a preferred embodiment, it will be understood by those skilled in the art that various changes in form and detail may be made therein without departing from the spirit and scope of the invention.

What is claimed is:

1. A method for cache line replacement within a data processing system that utilizes a cache memory, said method comprising the steps of:

performing a linefill operation on a cache line; and assigning said cache line an access status other than a most recently used status after said linefill operation without first assigning said cache line said most recently used status.

2. The method according to claim 1, wherein said method further includes a step of assigning said cache line to said most recently used status upon a subsequent reference to said cache line.

3. The method according to claim 1, wherein said access status can be predefined or adaptively altered during an operation of said cache memory.

4. The method according to claim 1, wherein said access status is stored within a configuration array.

5. A cache memory, comprising:

means for performing a linefill operation on a cache line; and means for assigning said cache line with an access status other than a most recently used status after said linefill operation without first assigning said cache line said most recently used status.

6. The cache memory according to claim 5, wherein said cache memory further includes a means for assigning said cache line to said most recently used status upon a subsequent reference to said cache line.

7. The cache memory according to claim 5, wherein said access status can be predefined or adaptively altered during an operation of said cache memory.

8. The cache memory according to claim 5, wherein said access status is stored within a configuration array.

9. A data processing system, comprising:

a main memory; and a processor coupled to said main memory via a cache memory, wherein said cache memory includes:

means for performing a linefill operation on a cache line; and means for assigning said cache line with an access status other than a most recently used status after said linefill operation without first assigning said cache line said most recently used status.

10. The data processing system according to claim 9, wherein said cache memory further includes a means for assigning said cache line to said most recently used status upon a subsequent reference to said cache line.

11. The data processing system according to claim 9, wherein said access status can be predefined or adaptively altered during an operation of said cache memory.

12. The data processing system according to claim 9, wherein said access status is stored within a configuration array.

* * * * *